(12) United States Patent
Mokshagundam et al.

(10) Patent No.: US 11,488,123 B2
(45) Date of Patent: Nov. 1, 2022

(54) BLOCKCHAIN PAYMENT NOTIFICATION SYSTEM

(71) Applicant: Capital One Services, LLC, McLean, VA (US)

(72) Inventors: Rajendra Mokshagundam, Schaumburg, IL (US); Smitha Menon, Hawthorn Woods, IL (US); Rajeesh Koythatta Mee, Schaumburg, IL (US)

(73) Assignee: Capital One Services, LLC, McLean, VA (US)

( * ) Notice: Subject to any disclaimer, the term of this patent is extended or adjusted under 35 U.S.C. 154(b) by 168 days.

(21) Appl. No.: 17/095,890

(22) Filed: Nov. 12, 2020

(65) Prior Publication Data

US 2021/0158313 A1   May 27, 2021

Related U.S. Application Data

(63) Continuation of application No. 16/693,522, filed on Nov. 25, 2019, now Pat. No. 10,867,288.

(51) Int. Cl.
| | |
|---|---|
| *G06Q 20/10* | (2012.01) |
| *G06Q 20/32* | (2012.01) |
| *G06Q 40/02* | (2012.01) |
| *G06N 20/00* | (2019.01) |
| *G06Q 30/04* | (2012.01) |
| *H04L 9/00* | (2022.01) |

(52) U.S. Cl.
CPC ............ *G06Q 20/10* (2013.01); *G06N 20/00* (2019.01); *G06Q 20/3278* (2013.01); *G06Q 30/04* (2013.01); *G06Q 40/02* (2013.01); *H04L 9/50* (2022.05); *H04L 2209/56* (2013.01)

(58) Field of Classification Search
CPC ..... H04L 9/50; H04L 2209/56; G06Q 20/065; G06Q 20/3278; G06Q 40/02; G06Q 20/02; G06Q 20/3678; G06Q 20/223; G06Q 30/04; G06Q 20/3827; G06Q 20/3829; G06Q 20/389; G06Q 20/10; G06N 20/00

See application file for complete search history.

(56) References Cited

U.S. PATENT DOCUMENTS

| | | |
|---|---|---|
| 7,191,150 B1 | 3/2007 | Shao et al. |
| 9,690,820 B1 | 6/2017 | Girulat, Jr. |
| 2016/0267605 A1 | 9/2016 | Lingham et al. |

(Continued)

FOREIGN PATENT DOCUMENTS

| | | |
|---|---|---|
| CN | 106796674 A | 5/2017 |
| WO | 2019116184 A1 | 6/2019 |

OTHER PUBLICATIONS

International Search Report and Written Opinion in corresponding International Application No. PCT/US20/61341 dated Feb. 9, 2021 (16 pages).

*Primary Examiner* — Scott S Trotter

(57) ABSTRACT

A system and method for payment notification using blockchain. The system and method relate to real-time monitoring and updating of a list of accounts that have not satisfied a minimum payment amount due. The real-time monitoring and updating of the list occurs through the use of a blockchain monitoring payment information by a user to the account. The blockchain is continually updated every time a payment is made. A notification system receives each update and is aware, in real-time, whether a user has satisfied a minimum payment amount due and thus whether an account is current or in need of a collections notification.

20 Claims, 5 Drawing Sheets

(56) References Cited

U.S. PATENT DOCUMENTS

| | | |
|---|---|---|
| 2017/0004550 A1 | 1/2017 | Shaaban et al. |
| 2017/0046694 A1 | 2/2017 | Chow et al. |
| 2017/0046698 A1 | 2/2017 | Haldenby et al. |
| 2017/0134161 A1 | 5/2017 | Goeringer et al. |
| 2018/0025181 A1 | 1/2018 | Barinov et al. |
| 2018/0285971 A1 | 10/2018 | Rosenoer |
| 2018/0293573 A1 | 10/2018 | Ortiz et al. |
| 2019/0132350 A1 | 5/2019 | Smith et al. |
| 2019/0325512 A1 | 10/2019 | Watson et al. |

BLOCKCHAIN PAYMENT NOTIFICATION SYSTEM

CROSS-REFERENCE TO RELATED APPLICATIONS

This application is a continuation of, and claims priority to, U.S. patent application Ser. No. 16/693,522, filed Nov. 25, 2019, which is incorporated herein in its entirety by reference.

TECHNICAL FIELD

Exemplary embodiments of the present invention relate generally to a payment notification system and, more particularly, a payment notification system employing blockchain.

BACKGROUND

Payment notifications are sent to users of credit accounts. Payment notifications may be collections notifications that are sent to a user after the payment due date when the user has not satisfied the minimum payment due by the due date. Currently, a batch process is performed to generate a list of accounts associated with users who have not remitted payment that satisfies the minimum payment due by the due date. The user may then receive a collections notification that the payment has not been received by the due date. If a user makes a payment after the batch process is performed but before the collections notification is sent, the user may still receive the collections notification. This is due to the fact that the batch process is static and only run a single time. Thus, for any payments submitted after the batch process is performed, the list of accounts that receives the collections notification is not updated. That is, the collections notification is not updated between the batch process and the sending of the collections notification to remove or otherwise reflect that a credit account is up to date because the user has submitted a payment that satisfies the minimum payment amount due.

BRIEF SUMMARY

According to an embodiment, a payment notification system may include a processor having access to a blockchain database on a distributed computing system; and a computer-readable storage medium having instructions stored which, when executed by the processor, cause the process to perform operations comprising: (a) receiving collections information from a batch process, the collections information representative of accounts that have not satisfied a minimum payment amount due by a due date; (b) generating a database from the batch process associating the accounts, the minimum payment amount due, and whether a payment satisfying the minimum payment amount due was performed by the accounts; (c) creating a list of accounts to send a collections notification to, the list of accounts based on the collections information and stored in the database; (d) receiving payment information of an account, the payment information identifying the account has satisfied the minimum payment amount; (e) generating a new block for the blockchain in response to the payment information, the new block including the payment information and personal identifying information of the account; (f) adding the new block to the blockchain to result in a modified blockchain; (g) distributing the modified blockchain to the distributed computing system; (h) comparing the payment information and personal identifying information of the account stored in the blockchain with the database; (i) determining, based on the comparing, that the account is included in the database and on the list of accounts stored in the database; (j) modifying the list of accounts stored in the database to remove the account from the list of accounts to result in a modified list of accounts stored in the database; and (k) sending the collections notification to the accounts on the modified list of accounts stored in the database.

According to an embodiment, a payment notification system may include a batch process system configured to: provide collections information from a batch process, the collections information representative of accounts that have not satisfied a minimum payment amount due by a due date; generate a database from the batch process associating the accounts, the minimum payment amount due, and whether a payment satisfying the minimum payment amount due was performed by the accounts; and create a list of accounts to send a collections notification to, the list of accounts based on the collections information and stored in the database; a blockchain system configured to: receive payment information of an account, the payment information identifying the account has satisfied the minimum payment amount due; generate a new block for a blockchain in response to the payment information, the new block including the payment information and personal identifying information of the account; add the new block to the blockchain to result in a modified blockchain; and distribute the modified blockchain to a distributed computing system; and a notification system configured to: compare the payment information and personal identifying information of the account stored in the blockchain with the database; determine, based on the comparing, that the account is included in the database and on the list of accounts stored in the database; and modify the list of accounts stored in the database to remove the account from the list of accounts to result in a modified list of accounts stored in the database, wherein the notification system provides a collections notification to the accounts on the modified list of accounts stored in the database such that any account that has not satisfied the minimum payment amount due by the due date receives the collections notification.

According to an embodiment, a non-transitory computer-readable storage medium having instructions stored which, when executed by a computing device having access to a blockchain database on a distributed computing system, cause the computing device to perform operations may include (a) batch processing, for a first time period, data representing satisfaction of a minimum payment amount by a due date, the batch processing resulting in a list of accounts that have not satisfied the minimum payment amount by the due date; (b) continuously, for a second time period, performing the below operations: receiving information that an account satisfied the minimum payment amount due; generating a new block for the blockchain, the new block representing that the account satisfied the minimum payment amount due; adding the new block to the blockchain to result in a modified blockchain and distributing the modified blockchain to the distributed computing system; modifying the list of accounts to remove the account resulting in a modified list of accounts; and (c) sending, after the second time period, a collections notification to the modified list of accounts.

BRIEF DESCRIPTION OF DRAWINGS

The description below refers to the following drawings of which.

DETAILED DESCRIPTION

The present disclosure relates to real-time monitoring and updating of a database of a list of accounts that has not satisfied a minimum payment amount due. The real-time monitoring and updating of the list occurs through the use of a blockchain monitoring payment information by a user to the account. The blockchain is continually updated every time a payment is made. A notification system receives each update and is aware, in real-time, whether an account has satisfied a minimum payment amount due and thus whether an account is current or in need of a collections notification. The real-time monitoring and updating of the account list with the use of the blockchain improves the efficiency of payment and collections notifications systems and removes the confusion and work associated with a batch process only system of monitoring payment information. The systems are freed from batch process, allowing system resources to be used for other tasks.

Figure 1:
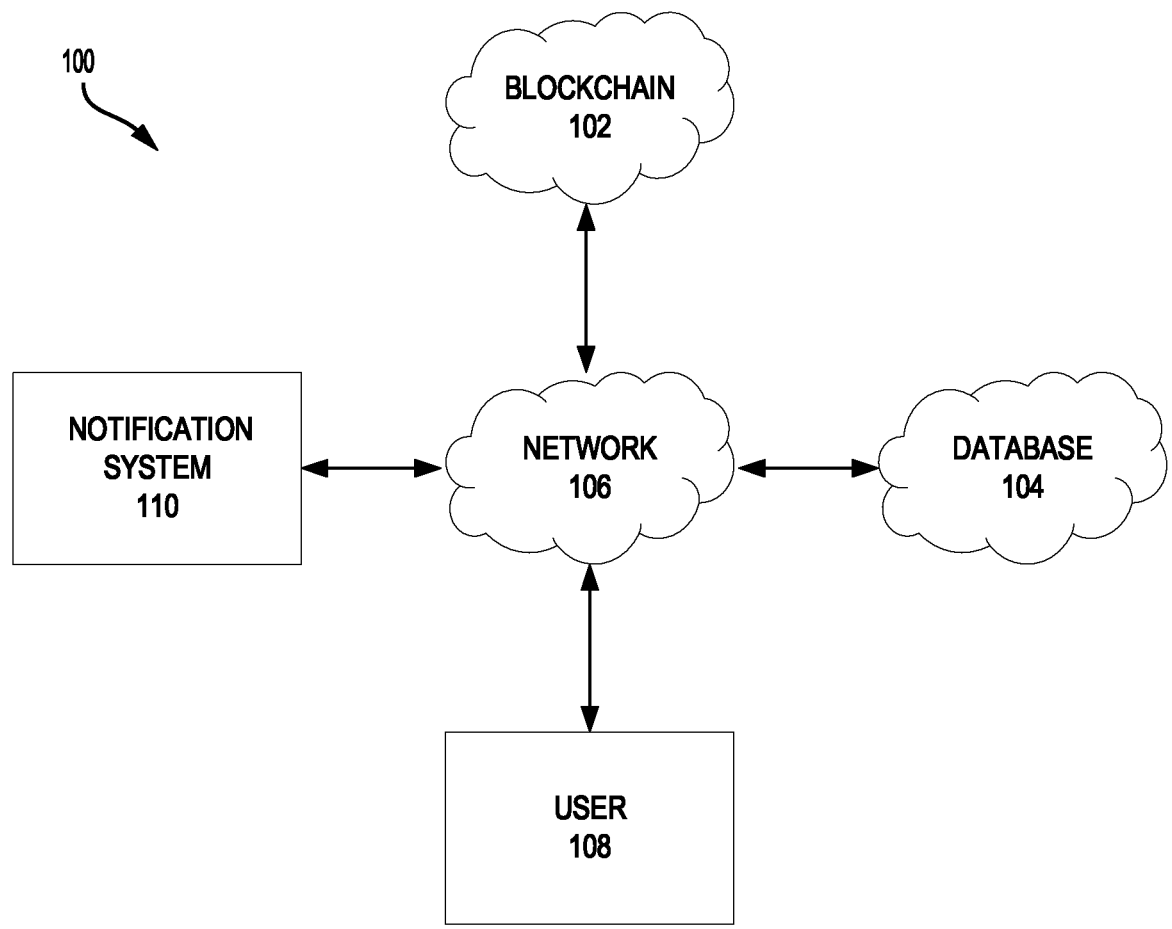
FIG. 1 illustrates an exemplary system configuration, according to an embodiment of the disclosure.

FIG. 1 depicts a schematic of an exemplary system 100. The system 100 may be a payment notification system, a collections notification system, or both. The system 100 may comprise systems with access to a blockchain 102 and a database 104 over network 106. The system 100 may enable a user 108 and a notification system 110 to share payment information, account information, and/or personal identification information. For each user 108, the system may collect, monitor, and store payment information with respect to the user's account in the database 104 and in the blockchain 102. The notification system 110 may obtain information from the database 104, the blockchain 102, or both, to provide notification to the user 108 if a minimum payment to the user's account has not been received by the due date, as will be described in more detail to follow.

Figure 2:
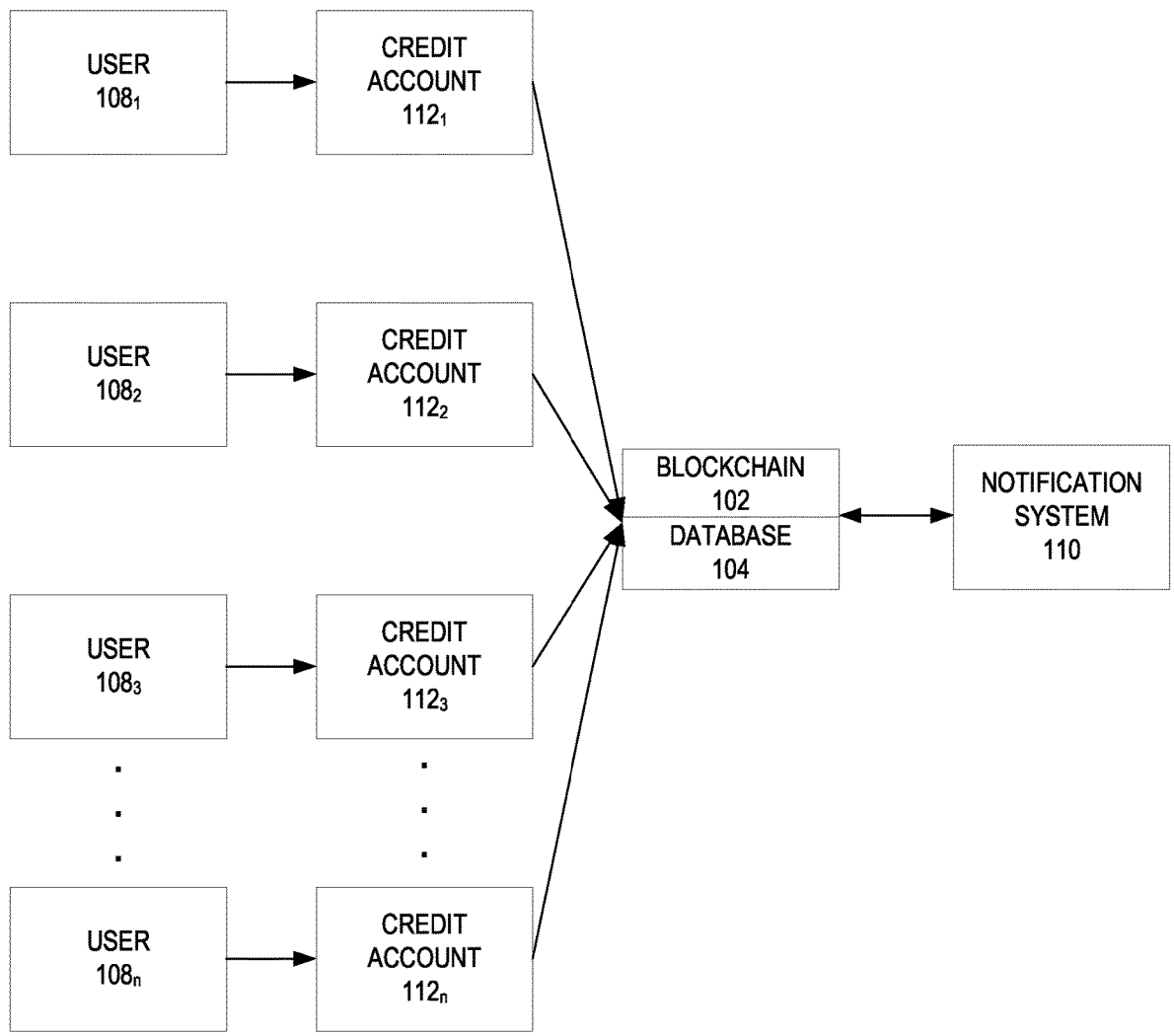
FIG. 2 illustrates an exemplary system, according to an embodiment of the disclosure.

Referring to FIG. 2, a plurality of individuals or users 108₁ . . . 108ₙ may each have a respective account 112₁ . . . 112ₙ. The account 112 may be, for example, a credit card, a loan account (e.g., auto or educational), a mortgage account, a line of credit, other credit accounts, etc. The account 112 may have a specified or predetermined due date by which a minimum payment amount is due to be paid to the account 112 by the user 108. The user 108 may be notified via a statement (either electronic or paper) of the due date and the minimum payment amount due by the due date.

The user 108 may make a payment at any time after receiving the statement. The payment may be for the minimum payment amount due, a lesser amount, or a greater amount. The payment may be multiple payments. The multiple payments may or may not satisfy the minimum payment amount due. The payment may be made before the due date, after the due date, or on the due date. Payment information for each payment made by the user 108 may be recorded in the database 104 and/or the blockchain 102. The payment information may be, for example, the payment amount, the payment date, the payment time, etc. Personal identifying information regarding the user's account 112 may be recorded in the database 104 and/or the blockchain 102. The personal identifying information may be, for example, the user's name, the user's account number, the user's physical mailing address, etc.

Figure 4:
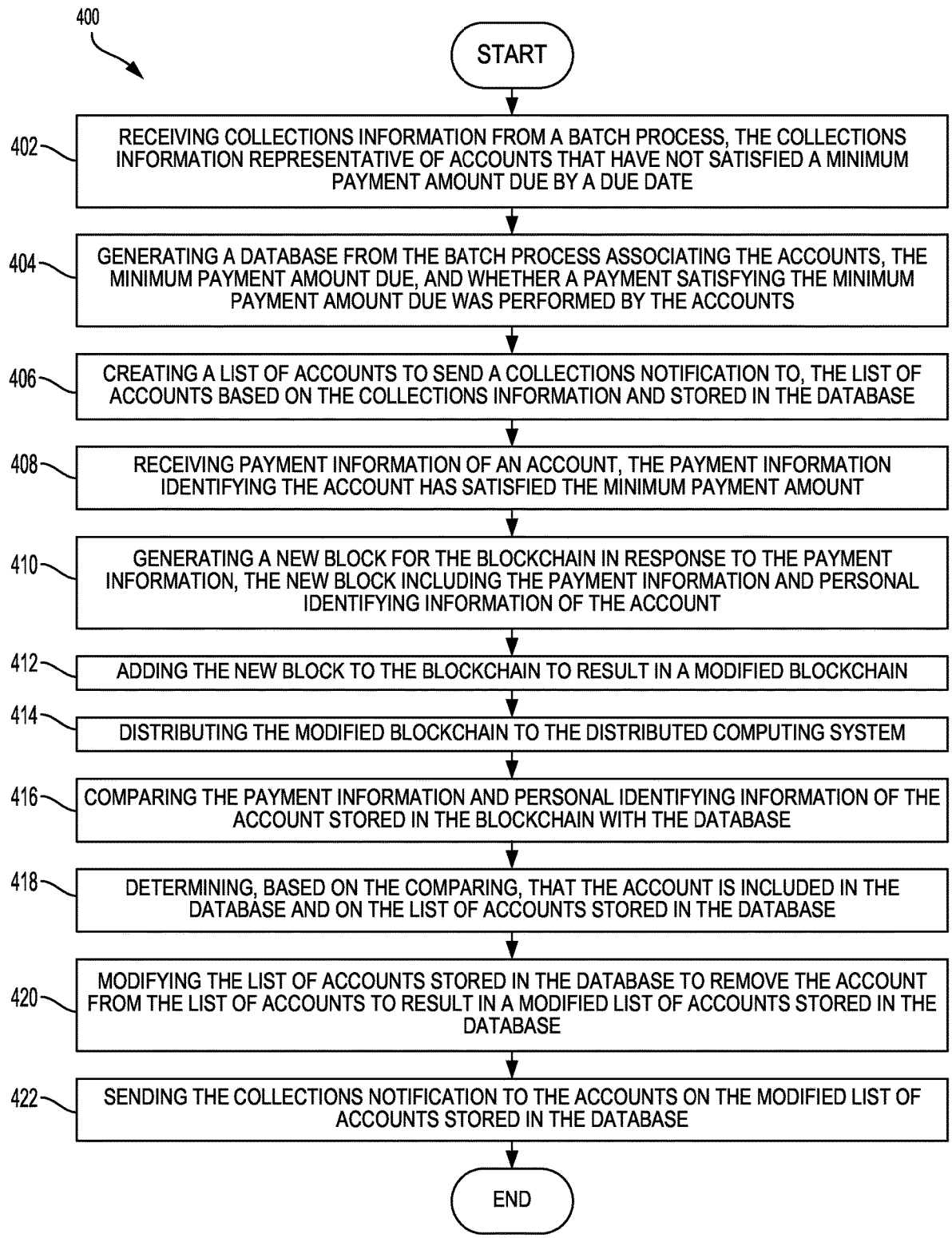
FIG. 4 illustrates an exemplary method, according to an embodiment of the disclosure.

With continued reference to FIG. 2, the notification system 110 may access the blockchain 102 and the database 104 to obtain the payment information and/or the personal identifying information, as is described in more detail with respect to FIG. 4. The notification system 110 may determine from the information stored in the blockchain 102 and/or the database 104 which of the plurality of users 108 has satisfied the minimum payment amount due by the due date. The notification system 110 may run a batch process of all of the plurality of users 108 collecting information from the database 104 and/or blockchain 102. The batch process may be run on the due date or after the due date. For example, the batch process may be performed at close of business on the due date or on the date immediately following the due date. The notification system 110 may generate a list of accounts that has not satisfied the minimum payment due amount and store the list on the database 104. For those users 108 that have satisfied the minimum payment amount due by the due date, the notification system 110 may take no action or may provide a notification to each user 108 that the user 108 has satisfied the minimum payment amount due by the due date. In this example, the notification system 110 may store a list of compliant accounts on the database 104. For those users 108 that have not satisfied the minimum payment amount due by the due date, the notification system 110 may send a collections notification to each user 108 that the user 108 has not satisfied the minimum payment amount due by the due date. In this example, the notification system 110 may store a list of non-compliant accounts on the database 104.

The notification system 110 may generate a list of accounts 112 that have not satisfied the minimum payment amount due at the time the batch process is performed (e.g., a list to include account 112₂ and other accounts who have not satisfied the minimum payment amount due). The list of accounts may be stored in the database 104. The notification system 110 may send each user 108 associated with an account on the list of accounts a collections notification indicating that the user has not satisfied the minimum payment amount due. The notification system 110 may be scheduled to send the collections notification at a predetermined time after the batch process is performed. After the batch process is run and before the notification system 110 sends the collection notification (e.g., at the predetermined time), the notification system 110 may continually receive, in real-time information from the blockchain 102 of users that have remitted payment to their respective accounts that satisfies the minimum payment amount due date. The notification system 110 may remove this account from the list of accounts stored in the database 104 that will receive a collections notification. Thus, a user who satisfies the minimum payment amount due after the batch process may be removed such that, at the predetermined time, the user does not receive a collections notification.

For example, user 108₁ may be a user that has satisfied the minimum payment amount due by the due date. Users 108₂ and 108₃ may be users that have not satisfied the minimum payment due amount at the time of the batch process. User $108_3$ may remit payment to the account $112_3$ after the batch process is performed. The payment may be a payment that satisfies the minimum payment amount due by the due date and/or may be a payment that adds to previous payment(s) such that in total, the minimum payment amount due is satisfied. When the batch process is run, the accounts $112_2$ and $112_3$ may be included on the list of users who have not satisfied the minimum payment amount due. That is, at the time the batch process is performed, neither the user $108_2$ nor the user $108_3$ has remitted a payment or payments which satisfy the minimum payment amount due. After the batch process is performed and the list of non-compliant accounts is stored in the database 104, the user $108_3$ may submit a payment that brings the account $112_3$ current (e.g., through full or partial payment that brings the total payment to the minimum payment amount due). This payment, like previous payments, may be stored in the blockchain 102. The notification system 110 may receive information on the payment by user $108_3$ from the blockchain 102. The notification system 110 may then remove the account $112_3$ from the list of accounts stored in the database 104 thus generating a modified list of accounts. The notification system 110 may store the modified list of accounts on the database 104. The notification system 110 may continually, on a real-time basis, receive payment information from the blockchain 102 and modify the list of accounts on the database 104 such that when the predetermine time for sending the collection notification arrives, the modified list of accounts represents only those individuals who have not satisfied the minimum payment amount due at the time of sending the collections notification. In the example described, the account $112_1$ of user $108_1$ was never on the list of accounts. The account $112_3$ of user $108_3$ was removed from the list of accounts thus generating a modified list of accounts stored on the database 104. The account $112_2$ of user $108_2$ remains on the modified list of accounts and the user $108_2$ receives the collections notification from the notification system 110. Although the example is shown with three users, more or fewer users may be included.

Figure 3:
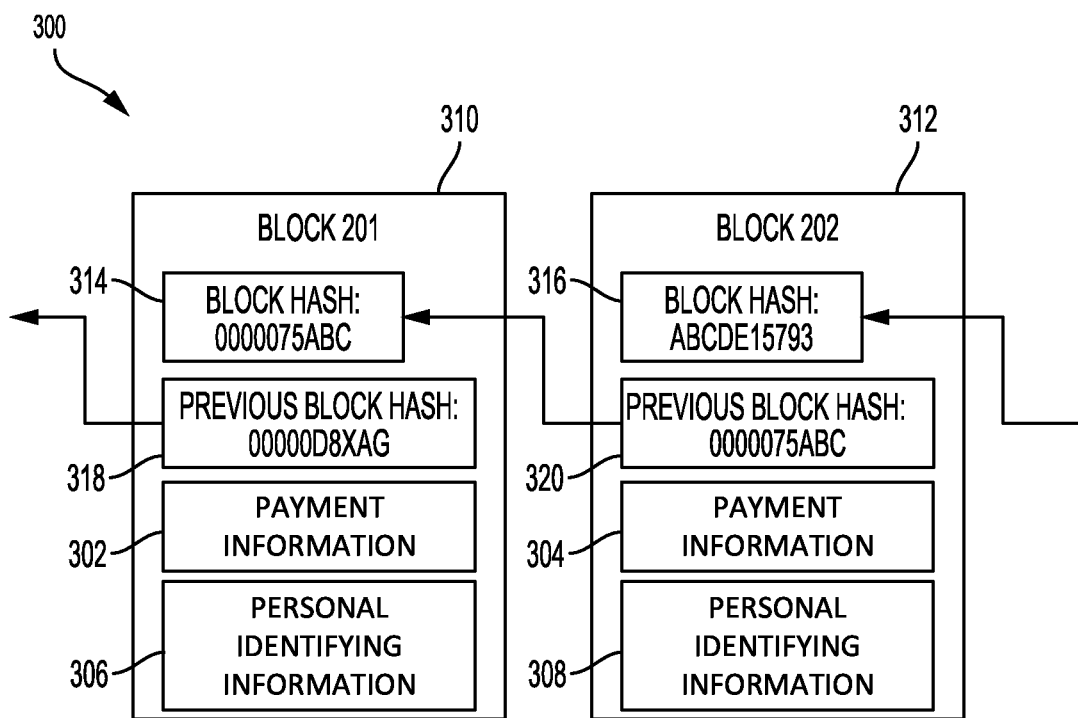
FIG. 3 illustrates an exemplary blockchain with payment information and personal identifying information, according to an embodiment of the disclosure.

Referring to FIG. 3, and as previously discussed, the payment information and/or personal identifying information regarding each account may be stored in the blockchain 102. FIG. 3 illustrates an exemplary blockchain 300 which may be employed for the blockchain 102. The exemplary blockchain 300 may include payment information 302, 304 and personal identifying information 306, 308. The payment information 302, 304 may be, for example, the payment amount, the payment date, the payment time, etc. The personal identifying information 306, 308 may be, for example, the user's name, the user's account number, the user's physical mailing address, etc.

In this example, there are two blocks 310, 312. Within each block 310, 312 there may be a block hash 314, 316, a reference to the previous block's hash 318, 320, as well as the payment information 302, 304 and the personal identifying information 306, 308. The block hash 314, 316 is the output of a hash function, where the inputs to the hash function include the payment information 302, 304 and the personal identifying information 306, 308 and the previous hash 318, 320. If there is a block number, or other identification, that information may likewise be included as an input to the hash function. The previous block hash 318, 320 refers to the hash function output of the previous block, such that the previous block hash 320 of the second block 312 refers to the block hash 314 of the previous block 310.

When changes to the payment information 302, 304 are detected, a new block can be generated and added to the blockchain, with updated payment information 302, 304 (e.g., creating a modified blockchain). In the above described example, the payment information for account 1123 has changed from a payment that does not satisfy the minimum payment amount due in the first payment information 302, to a payment that does satisfy the minimum payment amount due in the second payment information 304.

Referring to FIG. 4, an exemplary method 400 is illustrate. In the method 400, a system is configured to receive collections information from a batch process, the collections information representative of accounts that have not satisfied a minimum payment amount due by a due date (402); generate a database from the batch process associating the accounts, the minimum payment amount due, and whether a payment satisfying the minimum payment amount due was performed by the accounts (404); create a list of accounts to send a collections notification to, the list of accounts based on the collections information and stored in the database (406); receive payment information of an account, the payment information identifying the account has satisfied the minimum payment amount (408); generate a new block for the blockchain in response to the payment information, the new block including the payment information and personal identifying information of the account (410); add the new block to the blockchain to result in a modified blockchain (412); distribute the modified blockchain to the distributed computing system (414); compare the payment information and personal identifying information of the account stored in the blockchain with the database (416); determine, based on the comparing, that the account is included in the database and on the list of accounts stored in the database (418); modify the list of accounts stored in the database to remove the account from the list of accounts to result in a modified list of accounts stored in the database (420); and send the collections notification to the accounts on the modified list of accounts stored in the database (422).

Figure 5:
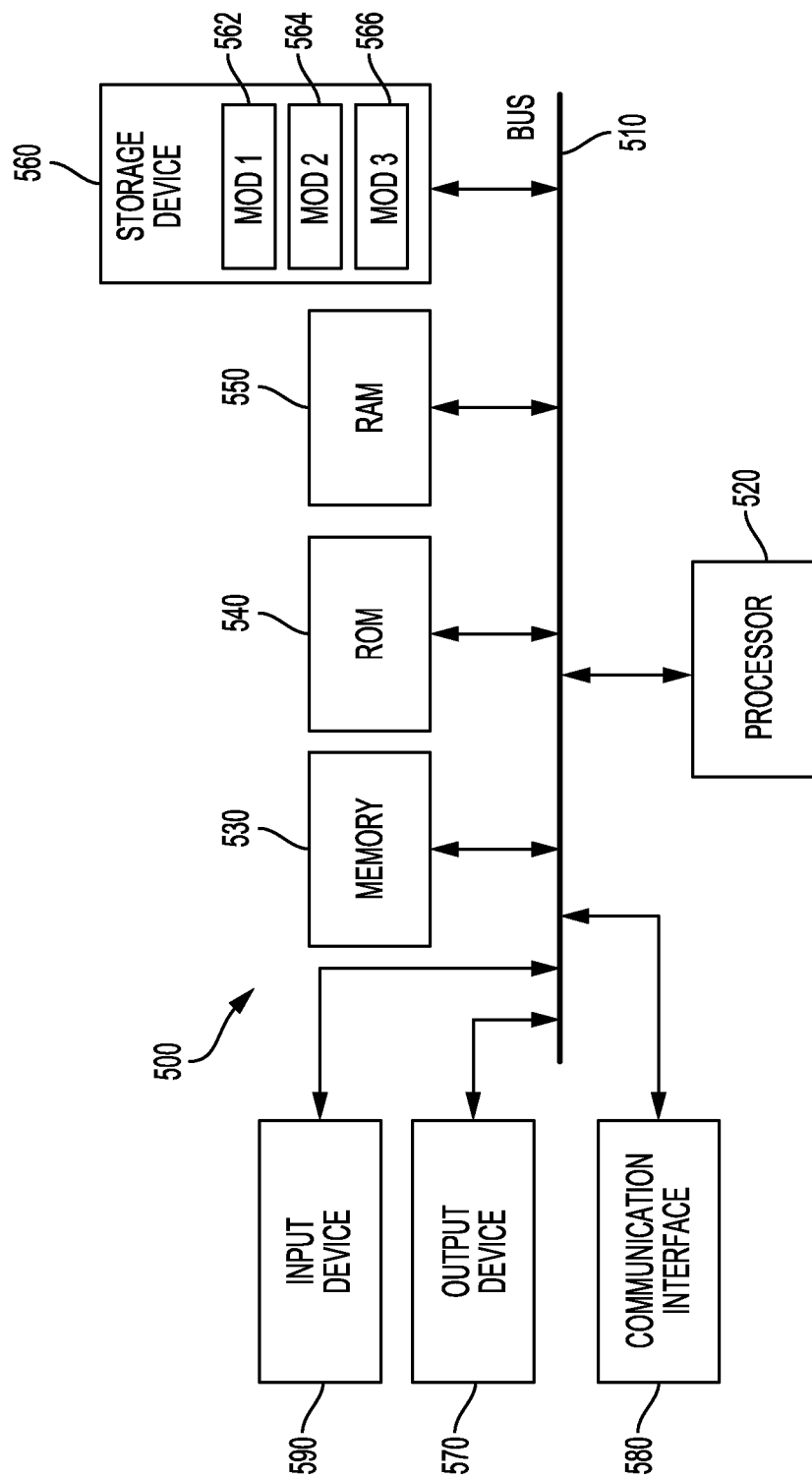
FIG. 5 illustrates an exemplary computer system, according to an embodiment of the disclosure.

With reference to FIG. 5, an exemplary payment notification system such as described in FIGS. 1-4 includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (just X, or just Y, or just Z) and multiple items (i.e., {X and Y}, {X and Z}, {Y and Z}, or {X, Y, and Z}). "At least one of" is not intended to convey a requirement that each possible item must be present.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A system comprising:
   a processor having access to a blockchain stored on a distributed computing system; and
   a computer-readable storage medium having instructions stored which, when executed by the processor, cause the process to perform operations comprising:
   executing an iterative batch process, the iterative batch process identifying, in each iteration, a plurality of accounts which have an outstanding action item; and
   while the iterative batch process continues execution:
   preparing a plurality of notifications to be sent to each account in the plurality of accounts regarding the outstanding action item;
   while preparing the plurality of notifications, receiving an electronic signal indicating a specific account in the plurality of accounts has met the outstanding action item;
   while simultaneously preparing the plurality of notifications, and in response to receiving the electronic signal:
   adding a new block to the blockchain, the new block having information about the specific account meeting the outstanding action item, resulting in a modified blockchain; and
   distributing the modified blockchain to the distributed computing system;
   removing the specific account from the plurality of accounts, resulting in a modified list of accounts and a modified plurality of notifications which does not include a notification for the specific account; and
   sending the modified plurality of notifications to the modified list of accounts.

2. The system of claim 1, wherein, in the new block, the information comprises a date and time when the outstanding action item was completed.

3. The system of claim 1, wherein removing the specific account from the plurality of accounts occurs upon completing preparation of the plurality of notifications.

4. The system of claim 1, wherein a prepared notification is not sent to the specific account.

5. The system of claim 1, wherein the modified plurality of notifications are one of an e-mail, text, or application notification representing that an account has not satisfied the outstanding action item by a due date.

6. The system of claim 1, wherein the iterative batch process identifies the plurality of accounts before the electronic signal is received.

7. The system of claim 1, wherein the electronic signal indicates that the specific account satisfied the outstanding action item after a due date.

8. The system of claim 1, wherein the receiving of the electronic signal occurs in real-time such that when the specific account satisfies the outstanding action item the specific account is removed from the plurality of accounts and does not receive a notification.

9. A method comprising:
retrieving, from a distributed computing system, a blockchain having information about a plurality of accounts;
executing an iterative batch process scanning, in each iteration, the blockchain for an outstanding action within the plurality of accounts, resulting in a list of delinquent accounts; and
while the iterative batch process continues execution:
  preparing a message to be sent to each account in the list of delinquent accounts, resulting in at least one message;
  while preparing the at least one message, receiving an indication that a specific account in the list of delinquent accounts has met the outstanding action;
  while simultaneously preparing the at least one message, and in response to receiving the indication:
    adding a new block to the blockchain, the new block having information about the specific account meeting the outstanding action, resulting in a modified blockchain; and
    distributing the modified blockchain to the distributed computing system;
  removing the specific account from the list of delinquent accounts, resulting in a modified list of delinquent accounts and a modified at least one message which does not include the message for the specific account; and
  sending the modified at least one message to the modified list of delinquent accounts.

10. The method of claim 9, wherein, in the new block, the information comprises a date and time when the outstanding action was completed.

11. The method of claim 9, wherein removing the specific account from the list of delinquent accounts occurs upon completing preparation of the at least one message.

12. The method of claim 9, wherein the message is not sent to the specific account.

13. The method of claim 9, wherein the at least one message is one of an e-mail, text, or application notification representing that an account has not satisfied the outstanding action by a due date.

14. The method of claim 9, wherein the iterative batch process identifies the list of delinquent accounts before the indication is received.

15. The method of claim 9, wherein the indication identifies that the specific account satisfied the outstanding action after a due date.

16. The method of claim 9, wherein the indication is an electronic signal.

17. A non-transitory computer-readable storage medium having instructions stored which, when executed by a processor, cause the processor to perform operations comprising:
executing an iterative batch process, wherein each iteration scans a plurality of accounts for an outstanding action item, resulting in a first list of accounts; and
while the iterative batch process continues execution:
  preparing a plurality of notifications, wherein each notification in the plurality of notifications is to be sent to an account in the first list of accounts regarding the outstanding action item;
  while simultaneously preparing the plurality of notifications:
    receiving an electronic signal indicating a specific account in the first list of accounts has met the outstanding action item;
    in response to receiving the electronic signal, modifying a blockchain having information about the specific account meeting the outstanding action item, resulting in a modified blockchain; and
    distributing the modified blockchain to a distributed computing system;
  removing the specific account from the first list of accounts, resulting in a second list of accounts; and
  sending the plurality of notifications to the second list of accounts.

18. The non-transitory computer-readable storage medium of claim 17, wherein the information comprises a date and time when the outstanding action item was completed.

19. The non-transitory computer-readable storage medium of claim 17, wherein removing the specific account from the first list of accounts occurs upon completing preparation of the plurality of notifications.

20. The non-transitory computer-readable storage medium of claim 17, wherein a notification is not sent to the specific account.

* * * * *